United States Patent
Meyr et al.

Patent Number: 5,566,031
Date of Patent: Oct. 15, 1996

[54] VEHICLE REAR VIEW MIRROR WITH SILICONE GEL AS AN ADHESIVE

[75] Inventors: Wolfgang Meyr, Munich; Helmut Piringer, Blumenstrasse 2a D-85598, Baldham, both of Germany

[73] Assignees: Bayerische Motoren Werke Aktiengesellschaft, Munich; Helmut Piringer, Baldham, both of Germany

[21] Appl. No.: 280,854

[22] Filed: Jul. 26, 1994

[30] Foreign Application Priority Data

Jul. 27, 1993 [DE] Germany ............ 43 25 124.2

[51] Int. Cl.⁶ .................. B60R 1/06; H05B 3/84
[52] U.S. Cl. ............ 359/883; 359/870; 359/512
[58] Field of Search .................. 359/883, 870, 359/512

[56] References Cited

U.S. PATENT DOCUMENTS

| | | | |
|---|---|---|---|
| 4,229,077 | 10/1980 | Schwab ............. | 359/883 |
| 4,408,021 | 10/1981 | Penn ............. | 525/440 |
| 4,468,848 | 9/1984 | Anderson et al. ............. | 359/852 |
| 5,155,625 | 10/1992 | Komatsu et al. ............. | 359/512 |
| 5,160,780 | 11/1992 | Ono et al. ............. | 359/871 |
| 5,440,425 | 8/1995 | Kadooka et al. ............. | 359/512 |

FOREIGN PATENT DOCUMENTS

| | | | |
|---|---|---|---|
| 2945780A1 | 5/1980 | Germany ............. | A61N 5/06 |
| 2041859 | 9/1980 | Germany ............. | 359/512 |
| 3205055A1 | 8/1983 | Germany ............. | A47G 1/00 |
| 8523328.5 | 1/1987 | Germany ............. | H05B 3/18 |
| 3825164 | 1/1990 | Germany ............. | H05B 3/84 |
| 2205075 | 11/1988 | United Kingdom ............. | B60R 1/08 |

OTHER PUBLICATIONS

Patent Abstracts of Japan, JP63284048, Nov. 21, 1988, Shimoda Riyouihi.
Patent Abstracts of Japan, JP4014642, Jan. 20, 1992, Hatasawa Takanobu.
Patent Abstracts of Japan, JP61093431, May 12, 1986, Shirai Yoshihiro.
Patent Abstracts of Japan, JP 54112658, Sep. 3, 1979, Nakamura Bunkichi.
2-173718 (A), Japan Abstract, Jul. 5, 1990, Yukio Nishikawa.
Ullmanns Encyklopädie der technischen Chemie, pp. 520-526. Band 21.

Primary Examiner—Terry Cunningham
Assistant Examiner—Terry L. Englund
Attorney, Agent, or Firm—Evenson McKeown Edwards & Lenahan, PLLC

[57] ABSTRACT

A vehicle rear view mirror comprising a mirror plate which is provided with a reflection layer and, on the surface facing the viewer of the mirror, is provided with a scratch-resistant protective layer. An adhesive layer which is essentially made of a silicone gel is arranged between the mirror plate and the reflection layer or between the reflection layer and the scratch-resistant protective layer. The silicone gel adhesive layer is formed by an addition cross-linking two-part silicone rubber and exhibits an elasticity which prevents excessive tensions in the mirror layers due to different thermal expansion coefficient of the layers.

28 Claims, 1 Drawing Sheet

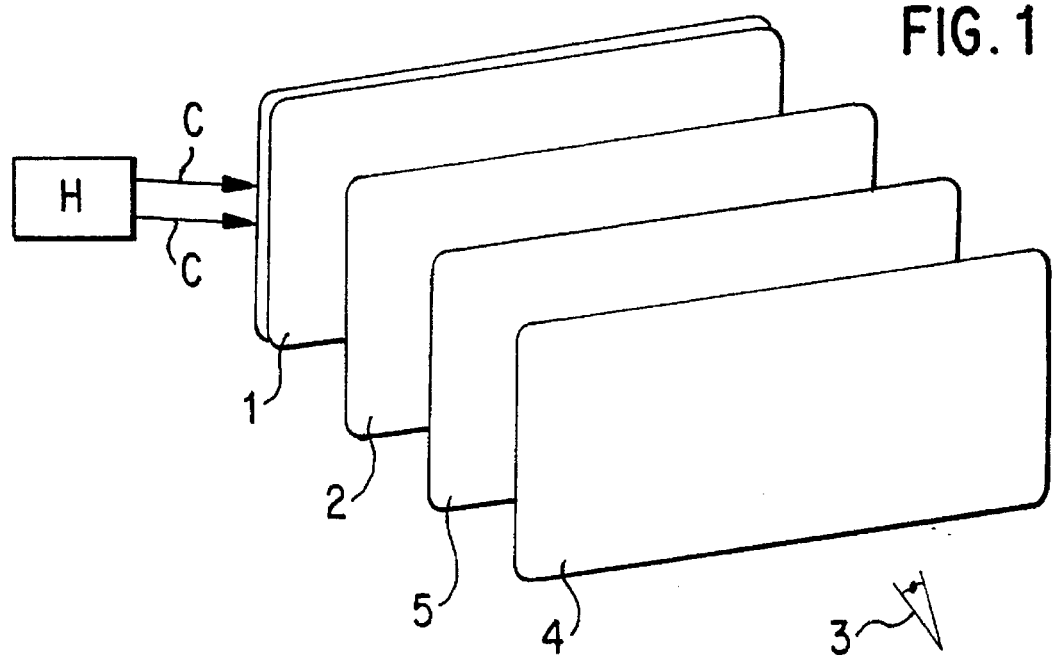
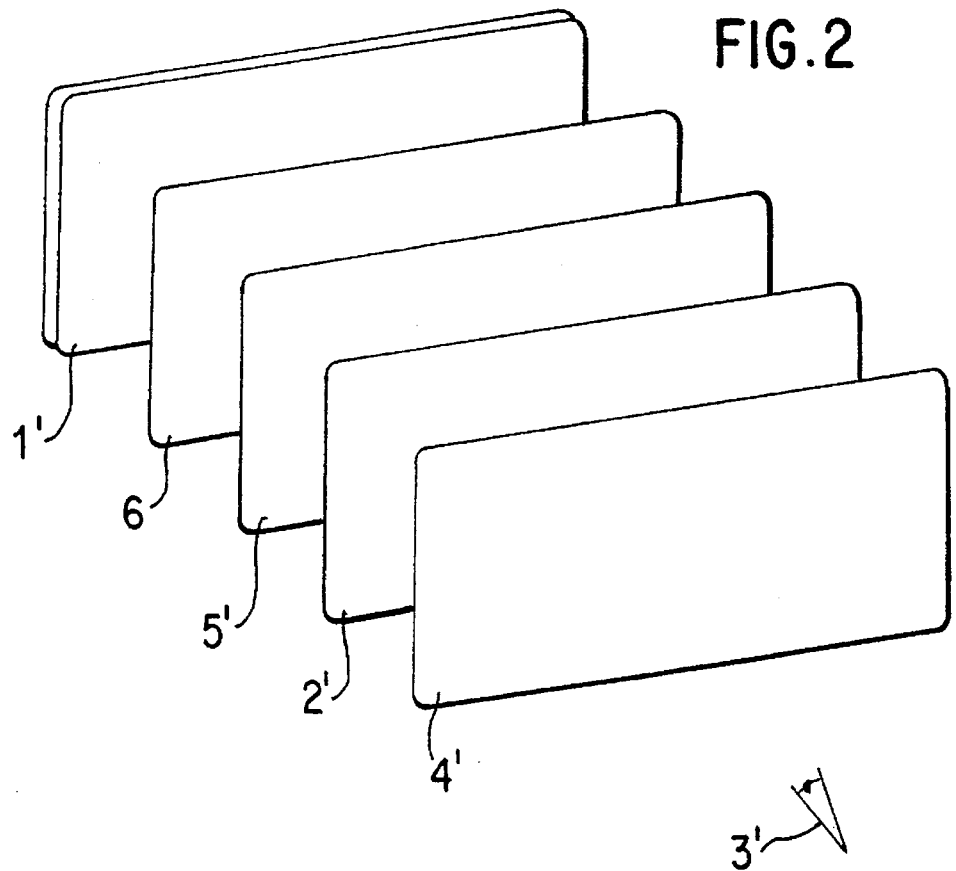

VEHICLE REAR VIEW MIRROR WITH SILICONE GEL AS AN ADHESIVE

BACKGROUND AND SUMMARY OF THE INVENTION

This invention relates to a mirror, particularly a vehicle rear view mirror, comprising a mirror plate, a reflection layer and a scratch resistant protective layer.

In German Patent Document DE 38 25 164 A1, a mirror of this type is a heatable outside vehicle mirror which has a mirror plate to which a reflection layer is applied, and the surface facing the person looking into the mirror is formed by a glass pane. The mirror support can be heated via electric supply devices. In order to cause an areal current conduction within the mirror plate, contact strips, which are connected with the electric supply devices, are provided on the sides of the mirror support. It is a particular disadvantage that the glass pane has a relatively large thickness which requires a high energy supply when the mirror is heated before precipitations are dissolved on the mirror surface. The thickness of the glass pane cannot be reduced since, as a result of the different coefficients of thermal expansion, stress is caused in the glass pane which would destroy it if it had a thin construction or it would impair the optical characteristics of the mirror. In a variant, the reflection layer is applied to the mirror support and, instead of the glass pane, a scratch-resistant and weathering-resistant coating is provided on the reflection layer. This construction has the disadvantage that the thin scratch-resistant and weathering-resistant coating may cause interference phenomena of the impinging light in the viewing surface of the mirror which become noticeable as interfering color fringes in the mirror image.

It is an object of the invention to provide a mirror of the above-noted general type which permits the use of materials which have at least partially very different coefficients of thermal expansion for the layers applied to the mirror surface or for the mirror plate. Furthermore, also in the case of a heatable mirror, it is to be possible to use a thin glass layer as a scratch-resistant protective layer on the side of the mirror which faces the viewer of the mirror.

This object is achieved according to preferred embodiments of the invention by providing a mirror assembly comprising a mirror plate, a reflection layer on top of the mirror plate, and a scratch-resistant protective layer on top of the reflection layer, said protective layer facing a viewer of the mirror when in use, wherein an adhesive layer is disposed between the reflection layer and one of the mirror plate and the protective layer, said adhesive layer consisting of a silicone gel made of an addition cross-linking two-part silicone rubber.

It is particularly advantageous that the adhesive layer made of silicone gel, on the one hand, connects the two adjoining layers and, if these layers have very different coefficients of thermal expansion, prevents excessive tensions in these layers as a result of its elasticity. The adhesive layer made of a silicone gel therefore permits the use of materials which were previously not usable for the layer construction of a mirror, or of materials which, because of the thermal stress to be expected, had previously been used only with larger minimal thicknesses. For example, the silicone gel permits the use of a thin glass layer as a scratch-resistant and weathering-resistant protective layer on the mirror surface facing the viewer of the mirror. Whereas, in the case of the state of the art, the glass pane which forms a protective layer has a thickness of approximately 2 mm, the use of an adhesive layer made of silicone gel can significantly reduce the thickness of such a glass pane to, for example, approximately 0.04 mm. A glass pane of a reduced thickness used as the protective layer has the important advantage that a significantly lower energy supply is required for the heating of the mirror before precipitations evaporate on the surface of the mirror.

Also when another protective layer, such as a plastic coating or a lacquer coating, is used on the mirror side facing the viewer of the mirror, the individual layers may at least partially have very different coefficients of thermal expansion because, when the mirror is heated by the sun or by a heater, the adhesive layer made of a silicon gel will prevent excessive thermal stress in the individual layers or in the mirror support. This effect of the adhesive layer made of silicone gel, which balances thermal stress in mirror layers and/or in the mirror plate, exists independently of whether the silicone gel is arranged between the mirror plate and the reflection layer and/or between the reflection layer and the scratch-resistant protective layer. If the protective layer facing the viewer of the mirror is formed by a thin glass pane, this glass pane can be glued on in an areal fashion without any breakage of the glass under the occurring thermal stress or without any impairment of the optical characteristics of the mirror. The silicone gel is known per se and can be purchased, for example, as SilGel 612 from the firm Wacker-Chemie. This Sil-Gel 612 is an addition cross-linking two-part silicone rubber which vulcanizes in a gel-type manner. Up to now, this silicone gel has been found to be suitable for use as a transparent sealing of electric and electronic components, as seals for clean-room filters, as transparent gluing, for producing adhesive tapes, for embedding glass fibers and for the manufacturing of shock absorbers. The use of the silicon gel according to the invention for the layer construction of a mirror which permits a use of materials having very different coefficients of thermal expansion has not been known so far.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded schematic view of a first embodiment of the present invention comprising an adhesive layer made of a silicone gel provided between the mirror plate and the reflection layer; and FIG. 2 is an exploded schematic view of a second embodiment of the present invention comprising an adhesive layer made of a silicone gel provided between the reflection layer and the scratch-resistant protective layer.

DETAILED DESCRIPTION OF THE PREFERRED EMBODIMENTS

The mirror provided in FIG. 1 according to a first embodiment is part of a vehicle rear view mirror which, in the conventional manner, has a mirror housing, which is not shown, and an adjustable mirror support with which the mirror illustrated in the figure must be connected. The mirror, whose basic construction is shown in a simplified manner, has a mirror plate 1 which, in the case of the embodiment shown, is made of a thermoplastic material, such as polyphenylene sulfide (PPS). This material permits a conductive heating of the mirror plate 1 via current connections C and heater H schematically depicted in FIG.

1. An adhesive layer 2 made of a silicon gel, which corresponds, for example, to the SilGel 612 obtainable from the firm Wacker-Chemie, is applied to the mirror plate 1.

A reflection layer 5 is applied to the rear side of a frontal protective layer 4 which faces away from the viewer 3 of the mirror and this reflection layer 5 is connected with the mirror plate 1 by way of the adhesive layer 2. The rear side of the protective layer 4, which faces away from the viewer 3 of the mirror, forms an optical, for example, polished surface for the reflection layer 5. In the case of the present construction, the reflection layer 5 is formed essentially either from Cr, Al or $TiO_2$. The protective layer 4 is a thin mirror glass pane which, in comparison to the known exterior vehicle mirror with a glass plane used as the protective layer, has a significantly smaller thickness of, for example, from 0.04 mm to 1.5 mm. The protective layer 4 made of a thin transparent glass plane should at least have such a thickness that interference phenomena of the impinging light are not noticeable in the viewing surface of the mirror or do not occur.

The adhesive layer 2 made of a silicon gel acts not only as the connecting medium for the two adjoining layers but also causes an electric insulation of the reflection layer 5 and of the protective layer 4 with respect to the mirror plate 1. The adhesive layer 2 made of a silicon gel also compensates thermal stress of the mirror plate 1, of the protective layer 4 and/or of the reflection layer 5, which has the result that the protective layer 4 formed by a thin glass pane will not break in the case of the occurring thermal stress and the optical characteristics of the mirror are maintained also in the case of very different coefficients of thermal expansion of the mirror plate 1, of the reflection layer 5 and of the protective layer 4.

As a result of the protective layer 4 consisting of a thin glass pane, the energy consumption for the heating of the mirror plate 1 and of the protective layer 4 is reduced considerably. In comparison to conventional protective layers of mirrors made of a different material, the protective layer 4 which is made of a thin glass pane is much more resistant to scratches and weathering. During the winter operation, for example, the mirror surface which faces the viewer 3 of the mirror may be cleaned by means of an ice scraper which comprises a nonferrous heavy metal as the scraper, without the risk that the mirror surface may be scratched or damaged.

The second embodiment according to FIG. 2 has a mirror construction which differs from that of the embodiment according to FIG. 1. In the case of this construction, an electric insulating layer 6 is applied to the conductively heatable mirror plate 1'. The insulating layer 6 is formed by a transparent or non-transparent layer made, for example, of a polysiloxane lacquer. In this construction, the surface of the mirror plate 1' which faces the electric insulating layer 6 has an optical, for example, polished surface. A reflection layer 5' which, as in the embodiment according to FIG. 1, is made of Cr, Al or $TiO_2$ is applied to the electric insulating layer 6. Also in the case of this construction, the mirror surface facing the viewer 3' of the mirror is formed by a protective layer 4' made of a thin glass Dane. By way of an adhesive layer 2' made essentially of a silicone gel, this thin glass pane is connected with the reflection layer 5'. In the case of this construction, the adhesive layer 2' also acts as an optical spacing layer which prevents interference phenomena of the impinging light in the mirror viewing surface. Furthermore, the adhesive layer 2' made of a silicone gel compensates stress caused by different thermal expansions of the protective layer 4', of the reflection layer 5', of the electric layer 6 and/or of the mirror plate 1'. There is no danger of a cracking of the thin glass pane which forms the protective layer 4' when the mirror is heated by the sun in the summer months and when the mirror plate 1' and the other layers, including the protective layer 4' are heated by means of the heater which is not shown.

The invention was explained by means of two embodiments to which the object of the invention is definitely not limited. Other constructions are also possible without giving up the idea of the invention. The mirror plate, which is preferably made of polyphenylene sulfide, may also be made of a different material; for example, when the mirror is not to be heatable or conductively heatable. The protective layer, which is formed by a thin glass pane in the illustrated embodiments, may also be formed of a different transparent material, for example, of an inorganic material, such as a thin-glass coating, or of an organic material, such as a scratch-resistant layered plastic or lacquer coating. Irrespective of whether the protective layer is formed of a thin glass layer or of a different material, stress in the mirror plate and/or in the mirror coatings caused by different coefficients of thermal expansion are compensated by the adhesive layer made of a silicone gel also when this adhesive layer is arranged only between the mirror plate and the reflection layer or between the reflection layer and the scratch-resistant protective layer or between the mirror plate and the reflection layer and between the reflection layer and the scratch-resistance protective layer. The reflection layer may also be formed by a material which deviates from the embodiments. The mirror plate is preferably manufactured from a thermoplastic material. A material on a duroplastic base is also suitable.

Other preferred embodiments are contemplated where the reflection layer is not applied directly to the mirror plate and the scratch-resistant layer is not applied directly to the reflection layer. In these embodiments, one or several intervening layers may be placed between the adhesive layer and the corresponding other layer, mirror plate, reflection layer, insulating layer and scratch-resistant layer. Any intervening layers which are disposed in the light path will be constructed to be transparent.

In especially preferred embodiments, the layers have the following thicknesses. In embodiments where the mirror plate is conductively heated, the thickness is determined by the electric resistance of the mirror plate. The mirror plate should also have sufficient mechanical stability. The mirror plate preferably has a thickness of between 2 mm and 3 mm so as to have sufficient mechanical stability while having a small enough thickness to facilitate rapid heating. The protective layer preferably has a thickness between 0.3 mm and 0.5 mm. The adhesive layer preferably has a thickness between 0.01 and 0.5 mm. The reflective layer and the insulating layer have a thickness which is customary according to their function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vehicle rear view mirror comprising the following mirror parts:

a mirror plate, a scratch resistant protective layer, a reflection layer between the mirror plate and the protective layer, and an adhesive layer disposed at one side of the reflection layer, said adhesive layer being composed of a silicone gel made of an addition cross-linking two-part silicone rubber which in use elastically limits excessive tensions caused by different thermal coefficients of expansion for the mirror parts.

2. The mirror according to claim 1, wherein the mirror plate is made of a plastic material which is electrically conductive.

3. The mirror according to claim 2, wherein the mirror plate is made of polyphenylene sulfide (PPS) material.

4. The mirror according to claim 3, wherein the mirror plate is configured to be heated by means of a heater preferably in a conductive manner.

5. The mirror according to claim 4, wherein the reflection layer is applied to a rearside of the scratch-resistant protective layer which faces away from a viewer of the mirror, and this rear side forms an optical polished surface.

6. The mirror according to claim 3, wherein the reflection layer is applied to a rearside of the scratch-resistant protective layer which faces away from a viewer of the mirror, and this rear side forms an optical polished surface.

7. The mirror according to claim 1, wherein the mirror plate is configured to be heated by means of a heater preferably in a conductive manner.

8. The mirror according to claim 1, wherein the reflection layer is applied to a rearside of the scratch-resistant protective layer which faces away from a viewer of the mirror, and this rear side forms an optical polished surface.

9. The mirror according to claim 8, wherein the scratch-resistant protective layer is formed as a transparent thin glass layer.

10. The mirror according to claim 8, wherein the scratch resistant protective layer is formed of organic material, such as a transparent scratch resistant plastic layer or lacquer coating.

11. The mirror according to claim 1, wherein the adhesive layer made of the silicone gel is arranged between the reflection layer and the scratch-resistant protective layer, and wherein an electric insulating layer is disposed between the mirror plate and the reflection layer.

12. The mirror according to claim 11, wherein the electric insulating layer is a lacquer coating.

13. The mirror according to claim 11, wherein the electric insulating layer is a further adhesive layer made of the silicone gel.

14. The mirror according to claim 11, wherein the scratch-resistant protective layer is formed as a transparent thin glass layer.

15. The mirror according to claim 11, wherein the scratch resistant protective layer is formed of organic material, such as a transparent scratch resistant plastic layer or lacquer coating.

16. The mirror according to claim 1, wherein the reflection layer is made of Cr, Al or $TiO_2$ material.

17. The mirror according to claim 1, wherein the protective layer has a thickness of between 0.04 mm and 1.5 mm.

18. The mirror according to claim 17, wherein the protective layer has a thickness of between 0.3 mm and 0.5 mm.

19. The mirror according to claim 18, wherein the adhesive layer has a thickness of between 0.01 and 0.5 mm.

20. The mirror according to claim 1, wherein the adhesive layer has a thickness of between 0.01 and 0.5 mm.

21. The mirror according to claim 1, wherein the mirror plate has a thickness of between 2 mm and 3 mm.

22. The mirror according to claim 1, wherein the scratch-resistant protective layer is formed as a transparent thin glass layer.

23. The mirror according to claim 22, wherein the thin glass layer has at least such a thickness that interference phenomena of impinging light are not noticeable in mirror viewing surfaces.

24. The mirror according to claim 22, wherein the thin glass layer has a thickness of between 0.04 mm and 1.5 mm.

25. The mirror according to claim 24, wherein the thin glass layer has a thickness of between 0.3 mm and 0.5 mm.

26. The mirror according to claim 25, wherein the adhesive layer has a thickness of between 0.01 and 0.5 mm.

27. The mirror according to claim 26, wherein the mirror plate has a thickness of between 2 mm and 3 mm.

28. The mirror according to claim 1, wherein the scratch resistant protective layer is formed of organic material, such as a transparent scratch resistant plastic layer or lacquer coating.

* * * * *